US008230513B2

(12) United States Patent
Chen et al.

(10) Patent No.: US 8,230,513 B2
(45) Date of Patent: Jul. 24, 2012

(54) METHOD AND APPARATUS FOR PROTECTING NETWORKS FROM UNAUTHORIZED APPLICATIONS (75) Inventors: Wenfeng Chen, Kanata (CA); Michel Ouellette, Orleans (CA); Delfin Montuno, Kanata (CA); Kent Felske, Kanata (CA)

(73) Assignee: Avaya Inc., Bashing Ridge, NJ (US)

( * ) Notice: Subject to any disclaimer, the term of this patent is extended or adjusted under 35 U.S.C. 154(b) by 0 days.

(21) Appl. No.: 13/169,627

(22) Filed: Jun. 27, 2011

(65) Prior Publication Data
US 2011/0320596 A1 Dec. 29, 2011

Related U.S. Application Data (62) Division of application No. 11/277,555, filed on Mar. 27, 2006, now Pat. No. 7,996,895.

(51) Int. Cl.
*H04L 29/06* (2006.01)

(52) U.S. Cl. ............ 726/25; 726/22; 709/223; 709/224; 709/225

(58) Field of Classification Search .................... 726/25; 709/223–225
See application file for complete search history.

(56) References Cited

U.S. PATENT DOCUMENTS

| 5,684,957 | A  | * | 11/1997 | Kondo et al. ............... 726/25 |
| 2001/0052014 | A1 | * | 12/2001 | Sheymov et al. ............ 709/225 |
| 2002/0116627 | A1 | * | 8/2002 | Tarbotton et al. ............ 713/200 |
| 2002/0116635 | A1 | * | 8/2002 | Sheymov ..................... 713/200 |
| 2002/0133586 | A1 | * | 9/2002 | Shanklin et al. ............. 709/224 |

* cited by examiner

*Primary Examiner* — Ponnoreay Pich
(74) *Attorney, Agent, or Firm* — Anderson Gorecki & Manaras LLP (57) ABSTRACT

A traffic controller is provided which integrates black-box tests of unauthorized applications to extract application characteristics from associated Internet traffic, exploits the networking information learned by host clients, actively scans and controls hosts on the corporate network, and dynamically configures a corporate firewall to block traffic to and from critical application network elements. As a result, the traffic controller effectively manages unauthorized applications and their associated traffic in a corporate environment.

10 Claims, 6 Drawing Sheets

METHOD AND APPARATUS FOR PROTECTING NETWORKS FROM UNAUTHORIZED APPLICATIONS

CROSS-REFERENCE TO RELATED APPLICATIONS

This application is a Divisional of U.S. patent application Ser. No. 11/277,555, entitled Method and Apparatus to Protecting Networks from Unauthorized Applications, filed Mar. 27, 2006 now U.S. Pat. No. 7,996,895, incorporated herein by reference.

FIELD OF THE INVENTION

This invention related generally to the field of networking and more particularly to network security.

BACKGROUND OF THE INVENTION

In a client-server architecture, a server controls the distribution of content to and among connected client devices. The hierarchical nature of the client-server architecture has many advantages. For example, because the server controls distribution of content to clients, the server can police the distribution of content to and between clients, thereby ensuring that appropriate level of protection is afforded to sensitive or copyrighted material. In addition, the server, as a centralized point of communication, can more easily detect intrusive or troublesome clients before network performance is affected. Many applications which execute on client-server networks are written as client server applications. In a manner consistent with the client-server architecture, the server application controls the protection and distribution of content to the client applications.

In contrast, in a Peer-to-peer (P2P) network, each participating 'peer' device has equivalent capabilities and responsibilities. As a result, P2P networks have a flat, distributed architecture. The lack of hierarchy in the P2P network makes it difficult to control the participating peers in the P2P network.

A problem exists when unauthorized P2P applications are introduced into traditional client-server environments such as corporate networks. Unauthorized P2P applications may be introduced into a corporate network by the employees or other clients with access to the corporate network. Certain models of P2P software seeks out other Internet users using the same program and informs them of a peer online presence, building a large network of computers as more users install and use the software. One example of such a P2P application is an Instant Messaging (IM) application.

Unauthorized P2P applications impose new challenges to network security and occupy a significant amount of network bandwidth, computer processing power and storage space that are critical to the normal operation of the corporation. Certain P2P applications may involve the illegal exchange of copyrighted materials by clients in the corporate network, thereby exposing the corporation to potential legal disputes related to such activities. In addition, the secretive nature of P2P applications makes it difficult to control the applications' activities and concomitantly the flow of information between the corporate network and the public internet. Confidential and critical corporate information may be exposed without any means of detecting the loss.

P2P applications may be intentionally designed to evade corporate networks protected by conventional firewalls and Network Address Translation (NAT) devices. For example, certain P2P applications may use random port numbers for P2P communication, encrypt messages to prevent high-layer analysis of traffic, use debugging prohibit technologies to prevent low-level analysis of the application, use special technologies such as Simple Traversal of UDP though NAT (STUN) and Traversal Using Relay NAT (TURN) to penetrate NAT devices, or attempt to connect using TCP over port 80 and 443 to disguise P2P traffic as legitimate HTTP/HTTPS traffic to deceive the firewall, or use multiple dynamic hosts as proxies for P2P communications.

Attempts to defend corporate networks from unauthorized P2P applications have included attempts to block or otherwise control access to firewall ports, block the download of P2P executables or block access to known central P2P registration servers. However, the currently available solutions have not proven sufficient to defend the corporate network from unauthorized P2P applications.

SUMMARY OF THE INVENTION

According to one aspect of the invention, a method of detecting unauthorized applications executing in a computer network includes the steps of identifying potential unauthorized applications and modeling the potential unauthorized applications to identify application configuration information including application peer contacts and resources used by the potential unauthorized application. The method also includes the steps of monitoring traffic in the computer network to detect communications with the peer contacts and requests for access to the resources used by the application and selectively blocking the communications and the requests for access to the resources.

According to another aspect of the invention, an apparatus for controlling application traffic in a computer network includes a client device for modeling the operation of a potential unauthorized application and a traffic analyzer. The traffic analyzer is coupled to the client device and operable to monitor traffic associated with the potential unauthorized application to extract application configuration information including addresses of devices communicating with the potential unauthorized application and resources accessed by the potential unauthorized application. The application configuration information is used to generate rules for selectively blocking the communications associated with the application configuration information.

With such an arrangement, application configuration information is made available for use by corporations and other enterprises to permit the enterprises to have greater control over the execution of unauthorized applications in their network.

DESCRIPTION

Figure 1:
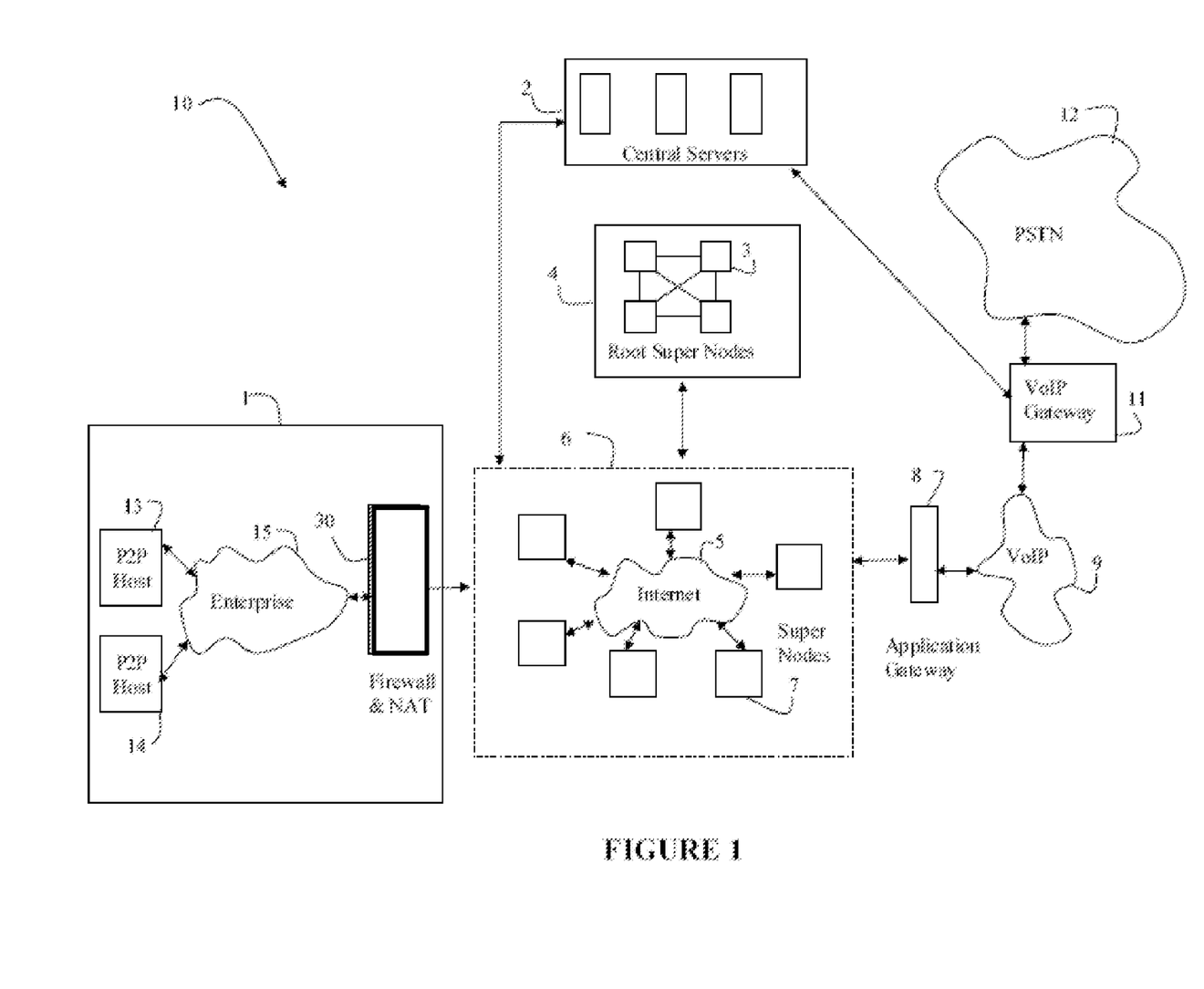
FIG. 1 illustrates an exemplary network including a corporate network in which the present invention may be employed.

Referring now to FIG. 1, a network 10 is shown to include several components for supporting peer-to-peer (P2P) applications. A P2P application is a piece of software that may be installed on any computer host and is distributed to interested parties, usually via a Wide Area Network (WAN) such as the Internet. The P2P applications typically provide content sharing capabilities between the coupled 'peer' hosts executing the same P2P application. One well known example of a peer-to-peer application is Napster, which allows peer-to-peer music sharing. Another well-known example is the Skype Voice over Internet Protocol (VoIP) application. The Skype VoIP application provides both Internet-bounded "free" PC-to-PC communication facilities, such as voice conversation, instant messaging, file transfer and other digital sharing, and voice communication between PCs on the Internet and phones on the Public Switched Telephony Network (PSTN).

The ability to freely share content has increased the popularity of use of P2P applications by Internet users. However the use of P2P applications by individuals within corporate or other enterprises disrupts the corporate network, using a significant amount of network bandwidth, processing and storage resources that are critical to the operation of the corporation. In addition, because P2P applications are typically designed to circumvent corporate firewalls or Network Address Translation (NAT) devices, it is difficult to control the inflow and outflow of content, thus compromising the security and integrity of corporate content. Thus, although enterprises such as enterprise 1 in FIG. 1 have typically positioned firewalls between the enterprise network 15 and the internet 6 to control the flow and exposure of content, the prior art firewalls and NAT devices have been ineffective at detecting use of peer-to-peer applications by the hosts 13 and 14.

To overcome this problem, the present invention provides an unauthorized application detection mechanism that may be included within a firewall, such as firewall 30. The unauthorized application detection mechanism includes an analysis tool for identifying and analyzing potential unauthorized applications to identify characteristics of the application, and a detection tool which uses the characteristic information provided by the analysis tool when monitoring network traffic to detect execution of the unauthorized applications by hosts in the network.

Both the analysis tool and detection tool will be described below with regards to a particular P2P application architecture. However, it should be understood that the present invention is not limited to use with peer-to-peer applications, but rather the concepts may be extended to assist in the analysis and detection of any type of unauthorized application.

A general problem with unauthorized applications is that characteristics of the application are not made publicly available. The analysis tool of the present invention thus seeks to collect application characteristic information to enable detection of the application by a firewall or other traffic monitoring device. However in order to collect application characteristics some knowledge regarding the architecture of the application is first garnered. Once the architecture of a particular application is known, an application data structure, or overlay, is provided. The application data structure includes a number of fields associated with the particular application architecture, with each of the fields storing one or more application characteristic. An example of how an application data structure would be populated with application characteristic information will now be provided with regard to the P2P application architecture of FIG. 1.

FIG. 1 illustrates one embodiment of a 'hybrid' P2P application architecture which includes central servers 2, root super nodes 4, ordinary super nodes 7, application gateways 8 and P2P clients, such as host 13 and 14. As opposed to 'flat' or 'pure' P2P networks, where every peer host has equivalent application capabilities, in the hybrid P2P network 10 the central servers 2 perform functions such as authentication, authorization, accounting and central storage. The central severs are provided by the provider of the P2P networking service (or operator). The super nodes, including root super nodes 4 and ordinary super nodes 7, act as proxies for the P2P clients to connect to the P2P network. With this arrangement, the P2P clients do not need to directly connect to the central servers for the demanded services. Instead, the P2P clients use the super nodes as proxies for communication with the central servers.

Each root super node 3 is different from ordinary super nodes 7 in several respects. First, the root nodes are dedicated hosts that are maintained by the P2P network operator. Second the number of root nodes is limited, unlike the number of ordinary super nodes that may grow as more hosts join the P2P network. Third, the root super nodes are typically only be used if the ordinary super nodes are not available. The super nodes thus form the 'backbone' of the P2P network that performs other essential functions such as directory search and locality services, in addition to the basic proxy service.

Application gateway 8 is a special-purpose server that interconnects the P2P host clients and central servers to other networks. For example, application gateway 8 links P2P hosts 13, communicating over the Internet 6 to VoIP network 9. A voice gateway 11 may be used to interconnect P2P clients to a Public Switched Telephone Network (PSTN).

Thus, each P2P client is a software entity that resides in a computer as an installed the P2P application, and receives service from other elements of the P2P network. The P2P client may traverse existing enterprise networks 15 for P2P network communication. It is the communication between the P2P clients in the enterprise network that is addressed by modified firewall 30.

Figure 2:
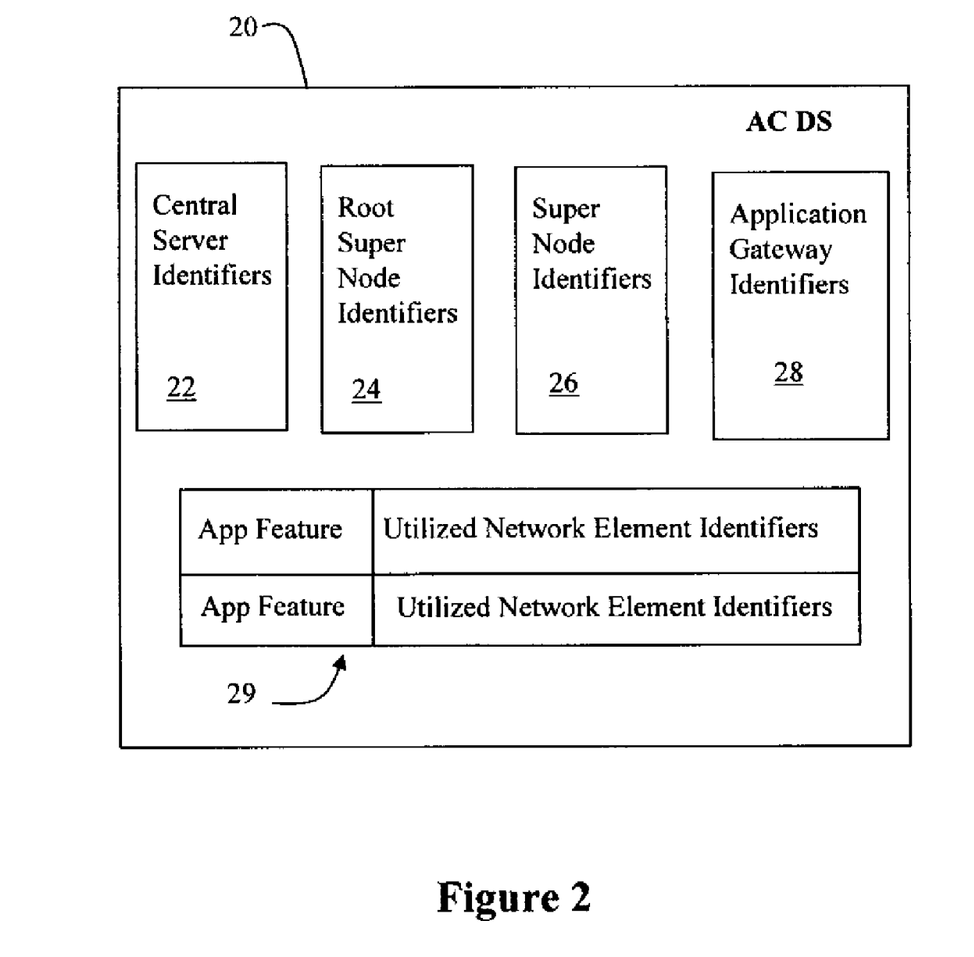
FIG. 2 is a diagram illustrating several elements that may be included in a data structure used for storing application characteristic information gathered according to the present invention.

FIG. 2 illustrates exemplary entries that may be included in an Application Characteristic Data Structure (AC DS) 30 that is formed in accordance to a target P2P application architecture such as that shown in FIG. 1. The AC DS 20 is shown to include a list of one or more central server identifiers 22, a list of one or more root super node identifiers 24, a list of one or more super node identifiers 26 and a list of application gateway or server identifiers 28. The identifiers in the lists 22, 24, 26 and 28 may be in the form of Internet Protocol (IP) addresses, port numbers and/or other relevant information used for communication between a P2P host and the respective devices.

The identifiers may be fixed during the lifecycle of the P2P application (for example, root super node identifiers), may be semi-fixed (such as application gateways) or may change dynamically during the lifetime of the P2P application (such as the ordinary super node identifiers). The fixed configuration information is either embedded in the P2P software executables or may be obtained manually. The semi-fixed and dynamically changeable configuration information may be embedded in the P2P software installer and initialized when the application is first installed on the P2P client host. Changes to this information occur during subsequent execution of the P2P application.

Other characteristics that may be stored in the AS DS 20 include a feature list 29. Each application may include a set of features or functions that use network element resources during its execution. Often a set of the features can be determined by analysis of the Application Programming Interface (API). Often API's are unpublished, however, making it difficult to directly determine the affected network resources. As will be described in more detail below, the present application indirectly determines network element utilization through a combination of traffic monitoring and other techniques. The feature list and affected network resources are stored in the AC DS 20.

In one embodiment, there is a separate AC DS for each known, unauthorized P2P application. In some embodiments, there may be multiple different AC DS's, for example for different versions of the same P2P applications that provide different feature sets or utilize different contacts. The present invention is not limited to any particular manner of representing the stored application characteristic information.

In general, P2P applications are designed to enable each P2P host to learn as much about the P2P network as possible, in order to improve the performance of the P2P application. However, P2P applications are also designed, for survival purposes, to ensure that the wealth of information about the P2P network is not readily humanly discernable. By obfuscating this information, the P2P application seeks to maximize its probability of communicating with other P2P hosts through firewalls and other NAT devices.

The present invention takes advantage of the wealth of knowledge incorporated in the P2P application by installing the P2P application on a controlled client device, and systematically adjusting application parameters, while monitoring traffic flow, to glean application characteristic information for population of the AC DS. The P2P application is treated as a 'black box' by monitoring only the interfaces of the application to obtain application characteristic information.

Figure 3:
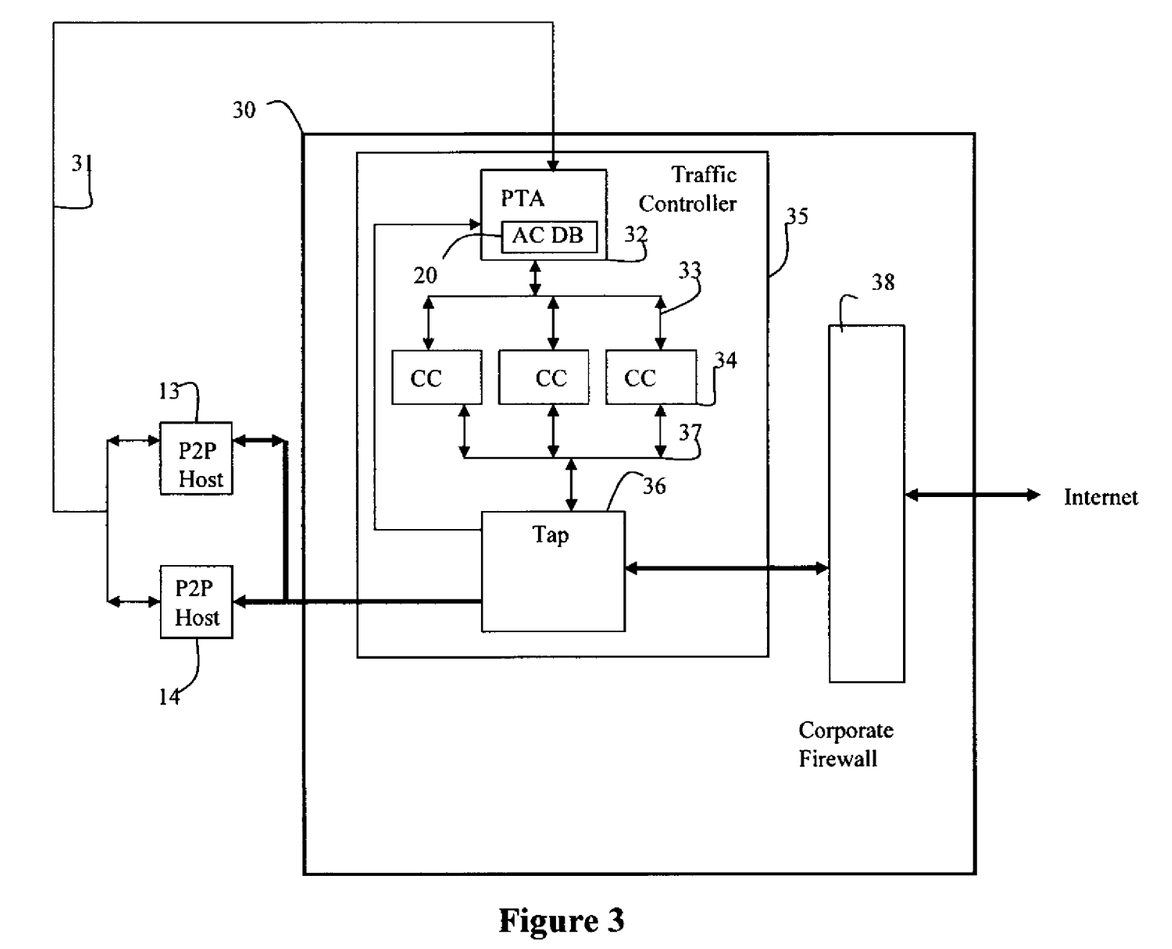
FIG. 3 is a block diagram illustrating several exemplary components that may be included in an application detection, analysis and control device of the present invention.

Referring now to FIG. 3 a block diagram of an improved firewall 30 is shown to include a traffic controller 35 of the present invention in conjunction with an external, corporate firewall 39. The corporate firewall 38 may be any firewall or NAT device. The traffic controller 35 may input rules to the firewall 39, to assist the firewall in controlling the traffic flow into and out of a corporation or other enterprise.

The traffic controller 35 includes a P2P Traffic Analyzer (PTA) 32, and one or more Controlled P2P Clients (CC) such as CC 34. The PTA 32 collects and stores P2P application characteristic information, both from the CCs 34 as well as from any P2P host clients in the corporate network, such as P2P hosts 13 and 14. The PTA includes functionality for testing P2P applications that are loaded on the CCs and the Hosts 13 and 14 to obtain the application characteristic information for population of the AC DS 20.

The Controlled Clients (CCs) 34 are hosts that run various versions of the P2P applications. The CCs 34 are exercised by the PTA 32 to perform known P2P application functions. Various versions, covering all known releases of a particular P2P application, may be instantiated in different CCs to cover as many conditions as possible, and to expose the connectivity and resource utilization information of the application.

In addition to receiving P2P application information from the CCs, the PTA is also coupled to hosts 13 and 14. The PTA may include or be coupled to configuration control logic, which scans coupled hosts to detect the operation of an unauthorized P2P application at either of the Host devices 13 and 14. Upon detection of the unauthorized P2P application at either of the Host devices, the configuration control logic of the PTA may augment the AC DS associated with the P2P application by extracting data from the P2P host device. For example, the PTA may similarly exercise the host P2P's application within the corporate network to extract additional application configuration information, or alternatively may collect the P2P specific system information, such as a Host Cache of P2P host 13 or 14, in order to expand the list of the super nodes maintained in the AC DS 20. The Host Cache includes a stored list of super nodes that are either pre-determined for or learned from the P2P network.

A tap 36 is disposed between the corporate firewall 39 and the CCs 34. The tap 36 forwards information, received from other P2P hosts in the Internet and targeted to the CCs 34 and actual P2P host devices 13, 14, to the PTA. Thus the PTA is situated to receive application characteristic information from a black box analysis of a controlled P2P client via CCs 34, from actual P2P host devices 13 via network connection 31, and also from any P2P hosts connected via the Internet. In such a manner, the PTA gains both an initial database of P2P application characteristics, as well as being able to monitor and update the database as it dynamically changes during the lifetime of the P2P application.

Using the knowledge about the P2P application characteristics allows the traffic controller to have an increased control over execution of P2P applications. Depending upon corporate policy, the traffic controller 35 may enforce the removal (quarantine) of the P2P application from the hosts. This can be done directly by the traffic controller 35, or indirectly by adding a specific virus definition to an existing virus protection program, which targets the P2P application. The traffic controller can also prohibit the P2P application from running on the corporate network by adding a target P2P "signature" or "finger print" to a system demon running on each host, so that the unauthorized P2P application is recognized and forced to stop each time it is started. Alternatively, the traffic controller may add the list of P2P network elements identified in the feature list 29 of the AC DS 20 to a corporate firewall 'blocking' list so that the P2P application will not be able to initialize or start. For example, a P2P application may have to connect to some Bootstrap Super Nodes in order to initialize and this information may be stored in the Host Cache, blocking access to these Bootstrap Super Nodes will prevent an application from starting up. The traffic controller may also shut down an actively running P2P application if communication with the Bootstrap Super Node, application gateway, central server or any other super node, is detected and the hosts running the P2P application are identified.

By integrating black-box tests that link application characteristics to Internet traffic, exploiting the P2P networking information learned by host P2P clients, continually actively scanning and controlling hosts on the corporate network, and dynamically configuring the corporate firewall to block traffic to and from critical P2P application network elements, the traffic controller effectively manages P2P applications and their associated traffic in a corporate environment.

Figure 4:
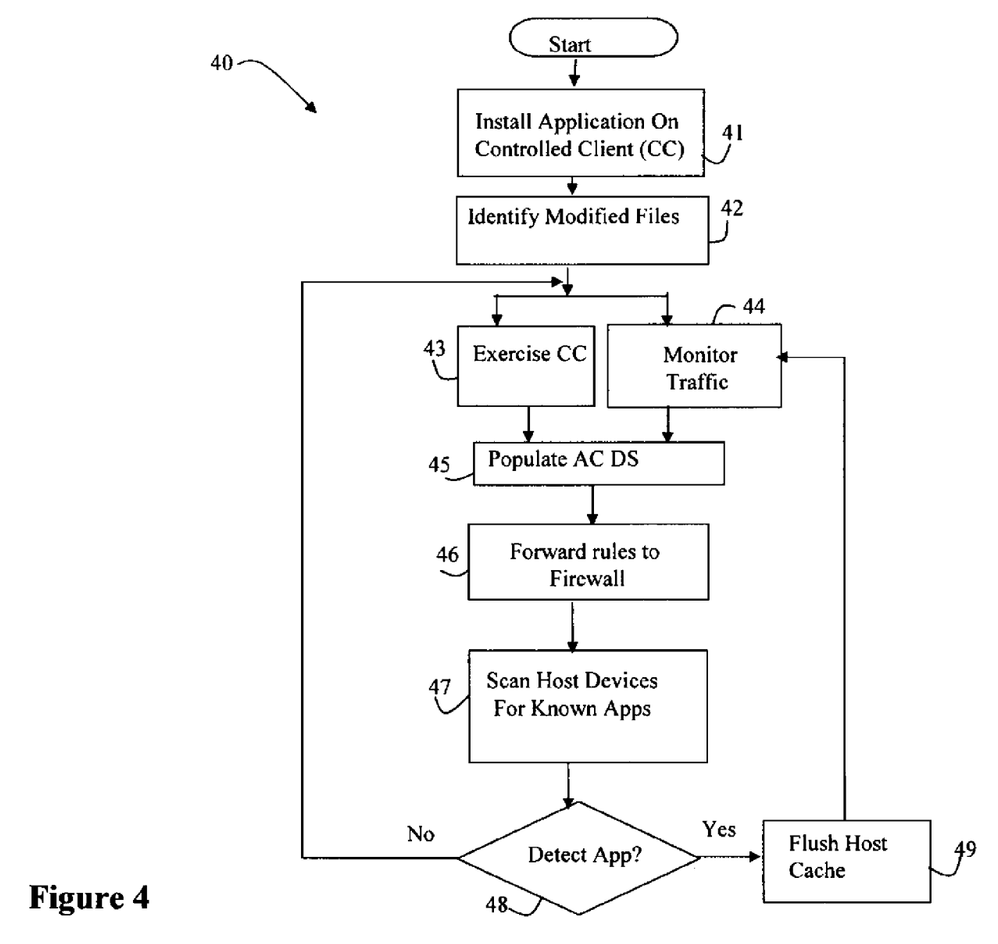
FIG. 4 is a flow diagram provided to illustrate exemplary steps that may be performed by the device of FIG. 3.
Figure 5:
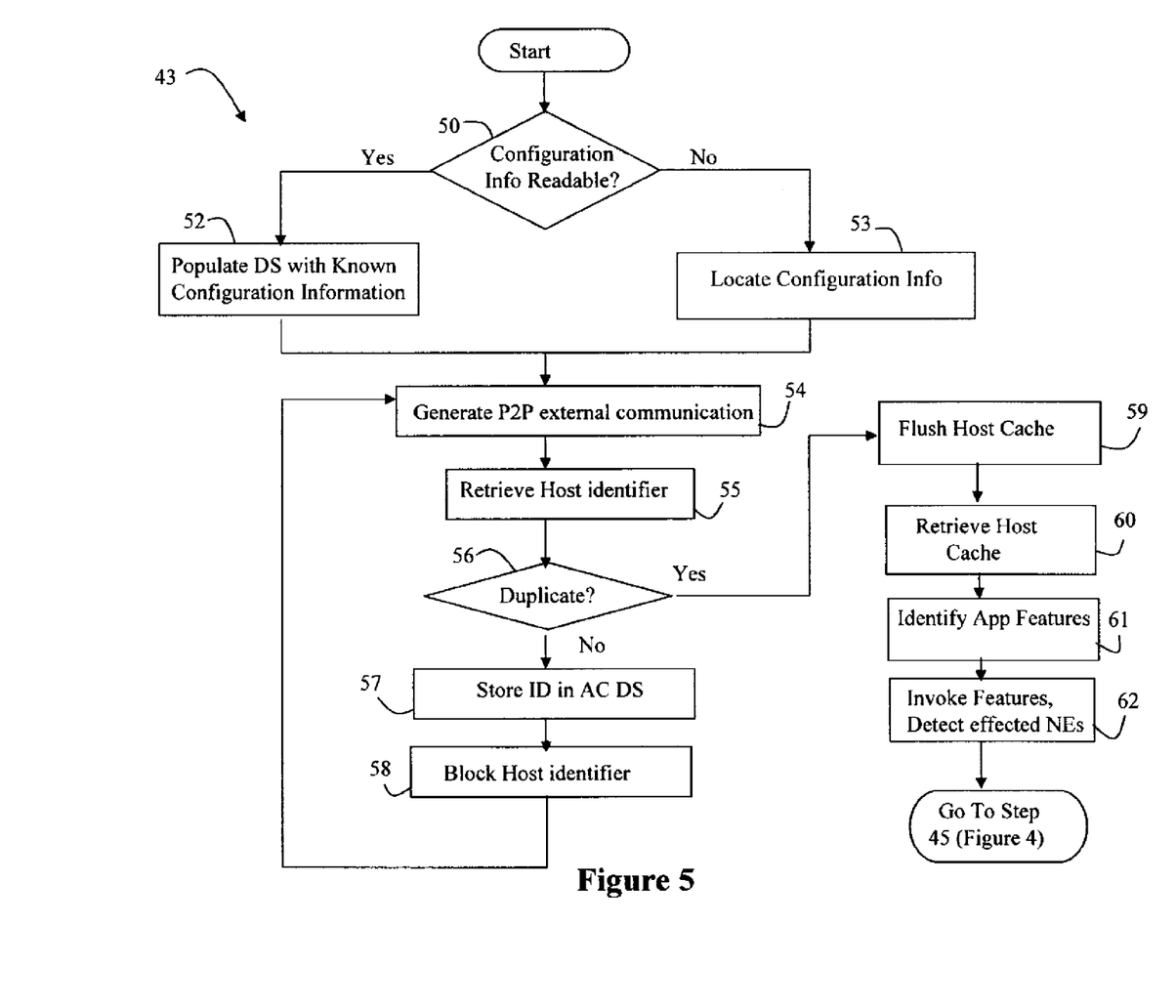
FIG. 5 is a flow diagram provided to illustrate exemplary steps that may be performed while exercising a controlled client to gather application configuration information in the process of FIG. 4.

Many different methods may be used to garner the application characteristics using the black-box approach of exercising a P2P application, monitoring the resultant traffic and identifying relevant application information. In particular, the exact methods or steps used to collect this information may vary depending upon the type of architecture of a P2P application. For example, obtaining configuration regarding a 'flat' or 'pure P2P' architecture would involve different steps than the one described below, as it would not attempt to locate root node or central server information. Accordingly, while FIGS. 4-5 illustrate exemplary steps that may be performed to obtain this information in a hybrid P2P network such as that illustrated in FIG. 1, these steps are presented as exemplary only. It will be readily appreciated that the present invention is not limited to any particular method of obtaining the application characteristic information and that equivalents to those illustrated, adapted due to different architectures or other considerations, are included in the breadth and scope of the present invention.

FIG. 4 illustrates several steps that may be performed in a process for collecting P2P application characteristics as may be performed by the PTA 35 for P2P applications executing in a network such as that illustrated in FIG. 1. At step 41a potential unauthorized application, for example a P2P application, is installed on a controlled client (CC). The client may be implemented through a combination of hardware and software. At step 42, following installation of the application, there will be some directory structures that are generated on the CC. Some system configuration information may also have been changed. Installing the application on a dedicated CC allows the relevant information to be readily attained and associated strictly with the P2P application.

Once the modified files have been identified at step 42 the process continues to step 43 and step 44, where the CC is exercised to populate the AC DS. Various steps that may be performed during the exercising of the CC are illustrated in FIG. 5. At step 50, it is determined whether the application configuration information is humanly readable. If so, then at step 52 the AC DS for that application is populated with whatever information is obtainable from the configuration files. If not, then the configuration information may be either encrypted, or embedded within the executable files, and it should be determined where the information is stored. Several methods can be used to determine where the information is stored. For example, if the configuration information is stored locally, but is not readable, then the modified files can be selectively deleted, and the application executed to monitor the exchange of information between the CC and any external hosts. If the configuration information is located in the executable file, then renaming or removing all the other modified files will not affect the application's communication with external hosts.

The process then proceeds to step 54 to initiate the collection of locally available application data. Several constants of the P2P application are exploited by the current invention when obtaining application characteristic information. First among the constants is the fact that a P2P client must connect to one of the super nodes (or other peers in a flat P2P network) to join the network and initiate operation. Thus, there will always be at least some fixed configuration information in the CC application, even if the configuration information is not readily discernable by the PTA. The communication between the P2P hosts is critical to the normal operation of the P2P application, and is always observable by the network administrator. By observing these communications, the AC DS can be easily populated with node identifiers in the following manner. At step 54, the CC is controlled to generate an external P2P communication. Under the typical P2P protocol, this communication will be to a known super node. At step 55, the super node identifier is obtained by the network administrator. If the node identifier is a duplicate of one of the identifier collected so far, then potentially all known locally available application characteristic information has been collected. If not, at step 57 the identifier is stored in the AC DS, and at step 58, the host identifier is forwarded to a block list at the firewall, to prevent further accesses.

The process returns to step 54, where another communication is generated at the CC. If the previous identifier is blocked, then the CC will attempt to forward the communication to the next known host identifier. The process of gathering locally known identifiers continues until all are identified, as determined at step 56.

Once all locally known identifiers are determined, the process continues to step 59 to expose network-wide configuration information. One method of doing so is to delete the locally stored super node configuration, which is known as the Host Cache. The Host Cache contains the host information (e.g., IP address and port number) that the client can attempt to connect as super nodes in later operations. Therefore, the Host Cache contains the critical information for the normal operation of the P2P application. If the host cache is corrupted, the P2P host falls back on any known root super node information embedded in the executables. That is, the P2P host will attempt to connect to the fixed root super nodes to join the P2P network and re-populate the Host Cache again, using the information obtained by the Root Super Nodes.

Thus, at step 59, the process flushes the Host Cache, causing the Host Cache contents to be refreshed, at step 60, with the contents of Super Node information from a Root Super Node. As a result, by intentional corruption of the local Host Cache, the complete network-wide configuration information about all ordinary super nodes currently in the P2P network is obtained.

At step 61 application features are identified. Some P2P networking applications may offer multiple features or different levels of service such as Instant Messaging, Voice Conversation, and File Exchange. Each feature has its own feature characteristics, such as which hosts (or servers) to contact and which type of lower level communication to use (such as Transmission Control Protocol (TCP), or User Datagram Protocol (UDP)). Identifying the particular characteristics associated with each of the features may assist the network administrator to apply corporate policies over the specific features. For example, a corporation may allow occasional instant messages or brief voice conversations, but prohibit file transfer for security reasons. At step 62, each of the features is individually invoked, and the characteristics and effected network elements are determined and stored in the AC DS associated with the application.

The process then returns to step 45 of FIG. 4, where the AC DS is populated with the information obtained during the exercise of the CC. At step 46, the traffic controller uses the collected application characteristic information to generate rules which are forwarded to the firewall or NAT device of the enterprise network. At step 47, the host devices in the network are scanned for instances of P2P applications. Should an application be detected at the host device, at step 49 the traffic controller can take steps to retrieve application characteristic information from the host device, for example by extracting the super node identifiers from the Host Cache, by flushing the cache as shown at step 49, or though the use of other methods described with regard to FIG. 5.

The process of exercising the CCs and scanning the Host devices repeats periodically, to ensure that an accurate representation of P2P application characteristic information is maintained, and thus to thereby ensure that appropriate policies are put in place at the firewall to protect the enterprise network.

Accordingly, a method and apparatus has been shown and described which allows P2P applications to be profiled, thereby facilitating collection of host information that is critical for the operation of the P2P application. Once this information is collected, a corporate policy that controls or restricts the operation of the application may be accurately enforced. By integrating black-box tests that link application characteristics to Internet traffic, exploiting the P2P networking information learned by host P2P clients, continually actively scanning and controlling hosts on the corporate network, and dynamically configuring the corporate firewall to block traffic to and from critical P2P application network elements, the traffic controller effectively manages P2P applications and their associated traffic in a corporate environment.

Figure 6:
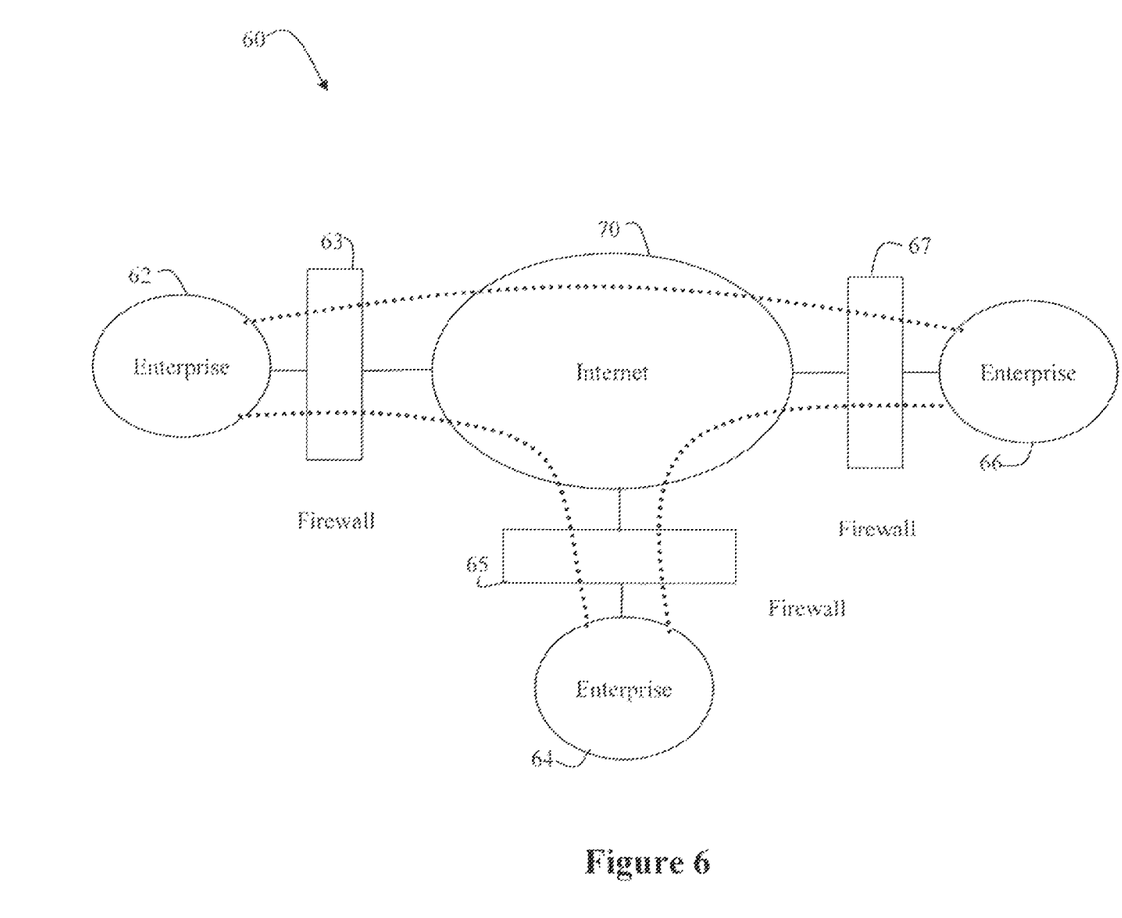
FIG. 6 is a block diagram of a distributed multi-site enterprise network in which the present application may be used.

Having described several embodiments of the invention, it will be appreciated that the above description and figures are merely illustrative of features and functions of the present invention. Although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof. For example, although FIG. 1 has shown the use of the present invention for managing P2P application use in a single site enterprise network, the present invention is not limited to use by single site enterprises. Rather the concepts may also be used to manage P2P applications in distributed multi-site enterprise networks such as that illustrated in FIG. 6. FIG. 6 illustrates an exemplary embodiment of a distributed/multi-site enterprise network 60, where the enterprise network includes geographically distributed sites 62, 64 and 66 which are connected to the Internet 70 via respective firewalls 63, 65 and 67. Host computers at the distributed enterprise sites communicate using secure channels, such as Virtual Private Networks. One or more of the firewalls 63, 65 and 67 at the enterprise sites would include improved firewall technology of the present invention, which incorporates the above described P2P application detection and control functionality. Each enterprise site would communicate known potential unauthorized P2P application information to the other sites to ensure consistent operation of all firewalls in the system. Thus it can be seen that the technology of the present invention may easily be incorporated into legacy systems, with known P2P information being shared among legacy and updated firewalls in a distributed multi-site enterprise.

Many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

In summation, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What we claim is:

1. An apparatus for controlling application traffic in a computer network includes:
    a client device including physical processing hardware and logic for modeling the operation of a potential unauthorized application;
    a traffic controller including a traffic analyzer, coupled to the client device and operable to monitor traffic associated with the potential unauthorized application to extract application configuration information including addresses of devices communicating with the potential unauthorized application and resources accessed by the potential unauthorized application; and
    wherein the application configuration information is used to generate rules for selectively blocking the communications associated with the application activities.

2. The apparatus of claim 1, wherein the client device includes a physical computer readable storage device for storing the potential unauthorized application, the client device for executing the potential unauthorized application.

3. The apparatus of claim 1, wherein the traffic controller further comprises a configuration collector comprising:
    means for scanning one or more coupled hosts in the computer network to determine whether a version of the potential unauthorized application is executing on the one or more coupled hosts; and
    means for collecting application configuration information from other hosts in the computer network determined to be executing versions of the potential unauthorized application.

4. The apparatus of claim 3, further including means for limiting the execution of the versions of the unauthorized application by the one or more hosts.

5. The apparatus of claim 4, wherein the means for limiting the execution of the versions of the potential unauthorized application includes means for forwarding a daemon to a host determined to be executing at least one of the versions, which is a peer-to-peer application, to terminate operation of the potential unauthorized application.

6. The apparatus of claim 5, wherein the means for collecting application configuration information from the other hosts includes means for flushing respective caches of the other hosts.

7. The apparatus of claim 1 further including a traffic tap, coupled to the traffic analyzer, the client device and an external firewall, for forwarding inbound traffic destined for the client device to the traffic analyzer and for filtering outbound traffic from the client device to assist in application configuration information collection.

8. The apparatus of claim 7, wherein the traffic analyzer further comprises:

means, responsive to the application configuration information, for configuring the external firewall.

9. The apparatus of claim 1 embodied in a firewall device of an enterprise network.

10. The apparatus of claim 9, wherein the enterprise network is a distributed multi-site enterprise network, and wherein the firewall device is provided at least one site of the distributed multi-site enterprise network.

\* \* \* \* \*